Sept. 15, 1964    L. C. GARDNER, SR., ETAL    3,148,902
PIPE JOINT FOR SOIL PIPES HAVING WEDGE LOCKING MEANS
Filed Sept. 20, 1961    2 Sheets-Sheet 1
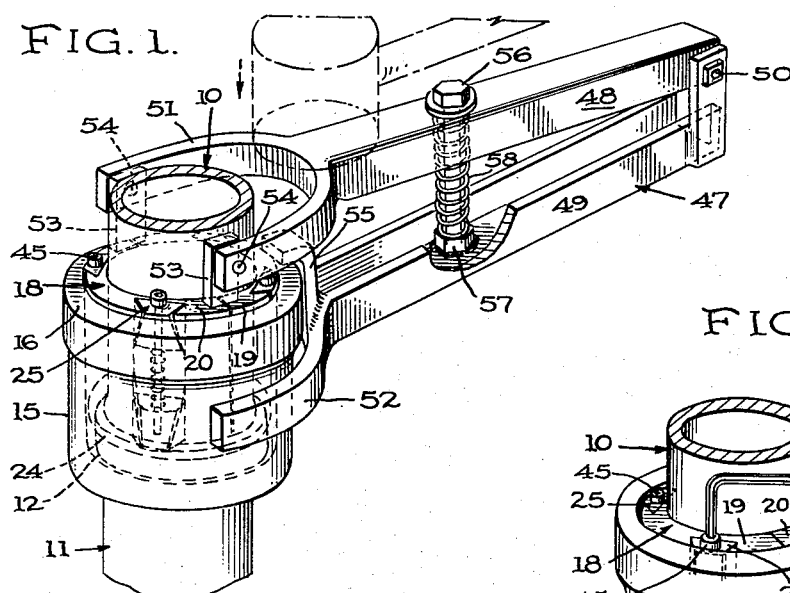
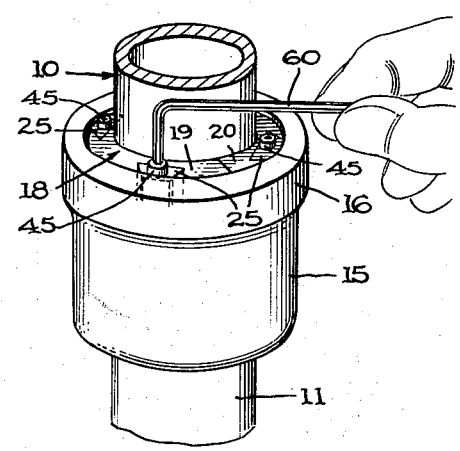
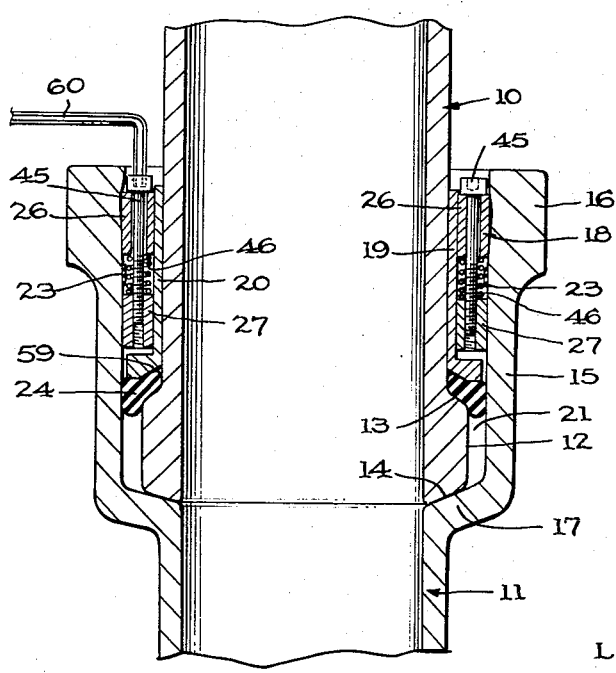
INVENTORS
LELAND C. GARDNER, SR
LAWSON F. WALDROP, JR.
BY
B. P. Fishburne, Jr.
ATTORNEY

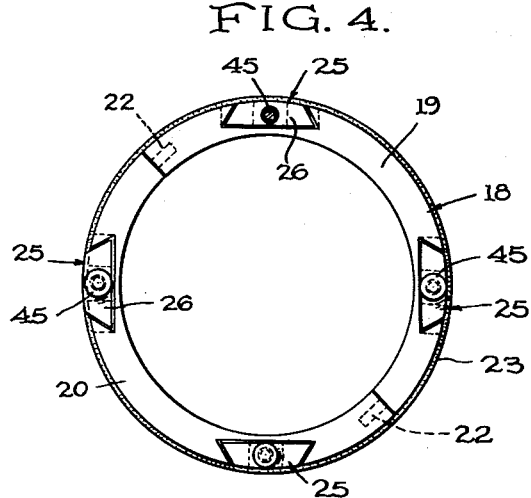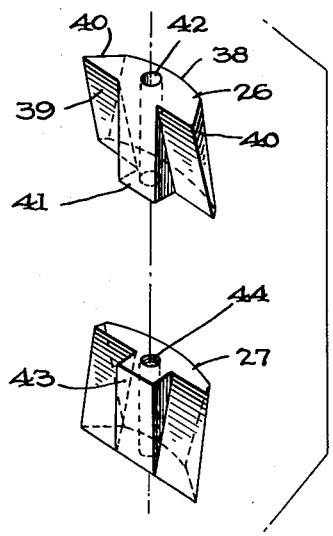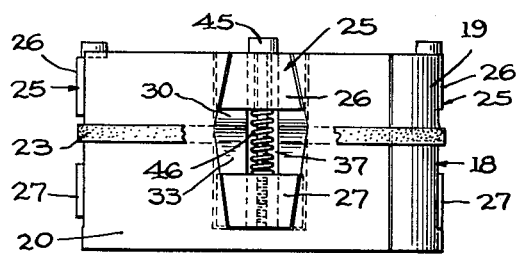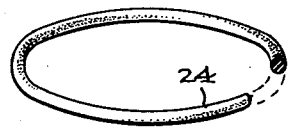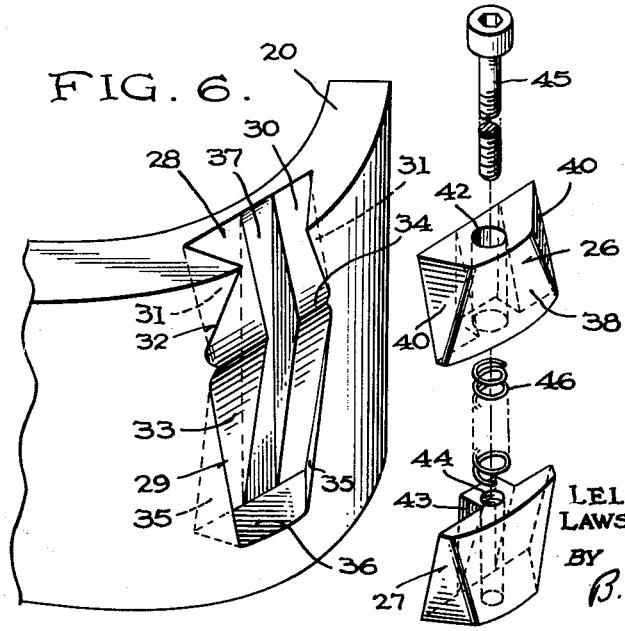

United States Patent Office 3,148,902
Patented Sept. 15, 1964

3,148,902
PIPE JOINT FOR SOIL PIPES HAVING
WEDGE LOCKING MEANS
Leland Charles Gardner, Sr., 519 Rich St., and Lawson F. Waldrop, Jr., 647 Meadowbrook Lane, both of Rock Hill, S.C.
Filed Sept. 20, 1961, Ser. No. 139,432
3 Claims. (Cl. 285—339)

This invention relates broadly to pipe joints and more particularly to an improved pipe joint for cast iron soil pipes and the like.

An object of the invention is to provide a soil pipe joint which will be a distinct improvement upon the conventional lead and oakum joint commonly employed in soil pipes and which will eliminate the necessity for using lead and oakum or like materials.

Another object of the invention is to provide a pipe joint which will effectively seal city water pressure and allow ready separation of the pipe sections without difficulty when required.

Another important object is to provide a pipe joint which is universally adjustable to compensate for irregularities and out-of-round conditions frequently encountered in the rough cast surfaces of soil pipes and the like.

A further object is to provide a simplified tool for installing the seal and adapter member forming the elements of the pipe joint without the necessity for any high degree of skill and without fracturing or breaking the pipe.

Other objects and advantages of the invention will be apparent during the course of the following detailed description.

In the accompanying drawings forming a part of this application and in which like numerals are employed to designate like parts throughout the same, FIGURE 1 is a perspective view of a pipe joint according to the invention and a tool or implement employed for making the joint, FIGURE 2 is a further perspective view of the completed pipe joint and illustrating the final tightening of the locking wedge elements, FIGURE 3 is an enlarged central vertical longitudinal section through the pipe joint according to the invention, FIGURE 4 is an end elevation of the adapter assembly employed in the making of the joint, FIGURE 5 is a side elevation of the adapter assembly partly broken away, FIGURE 6 is a fragmentary exploded perspective view of the same on an enlarged scale, FIGURE 7 is a similar perspective view of a pair of coacting locking wedge elements employed in the adapter assembly, FIGURE 8 is a perspective view of an annular seal.

In the drawings, wherein for the purpose of illustration is shown a preferred embodiment of the invention, the numerals 10 and 11 designate respectively the spigot and bell ends of pipe sections to be joined, and formed of cast iron or the like. The spigot end 10 has the usual annular enlargement 12 at its leading end, such enlargement having tapered faces 13 and 14 extending circumferentially thereof. The bell end 11 has the usual enlarged cylindrical hub or female fitting 15 integral therewith and including a thickened end flange 16 and an inclined shoulder portion 17 to be engaged by the tapered face 14 of the spigot end in assembly, FIGURE 3.

The usual practice involves the filling of the annular space between the interfitting pipe ends with lead and oakum or some similar sealing compound to form the required pipe joint. According to the present invention, this procedure is entirely eliminated and the pipe joint and seal is effected by readily adjustable mechanical means which are easy to install, adjust and remove as required.

With continued reference to the drawings, the numeral 18 designates generally an annular adapter assembly or ring, formed preferably in two separate semi-circular sections 19 and 20 and having an axial length equal to about one-half the axial depth of the chamber 21 between the interfitting pipe ends 10 and 11, FIGURE 3. The semi-circular adapter sections 19 and 20 are each provided upon opposite sides thereof with a dowel pin 22 having piloting engagement within a small opening formed in the opposite section 19 or 20. An elastic band 23 or the like may be employed to maintain the adapter sections 19 and 20 assembled as in FIGURE 4 but permitting the separation thereof to facilitate the engagement of the assembly 18 over the spigot end 10. The adapter assembly 18 may be formed of metal such as aluminum or the like or it may be formed from other suitable materials such as plastics materials, if preferred.

The adapter assembly 18 presently to be described in detail is employed in conjunction with an annular seal or gasket 24 of the O-ring type, FIGURE 8, formed of rubber or rubber-like material. As will be further described hereinafter, the seal 24 in assembly engages the tapered shoulder 13 of the spigot end 10 and also the bore of the hub 15 under compression, FIGURE 3. The adjustable adapter assembly 18 presses the seal 24 and locks the same in sealing relation with the pipe ends 10 and 11 within the annular chamber 21, as will be further described.

The adapter assembly 18 embodies preferably four sets or pairs of adjustable locking wedge elements or units 25, two such adjustable units being mounted upon each section 19 and 20 in circumferentially equidistantly spaced relation, FIGURES 4 and 5.

Each locking wedge unit 25 embodies a pair of similar although non-identical wedge elements 26 and 27 engageable adjustably within a pair of dovetailed grooves 28 and 29 formed in the outer faces of the semi-circular sections 19 and 20.

Each upper dovetailed groove 28 has a bottom wall 30 inclined at an angle with respect to the pipe axis and the angle is relatively steep such as from 22–25 degrees or the like measured from the longitudinal axis of the pipe. The sides 31 of the dovetailed groove 28 also converge upwardly to prevent the escape of the upper wedge element 26 through the top end of the groove 28. The element 26 is, however, removable bodily through the lower wide mouth 32 of dovetailed groove 28 when required. The lower groove 29 has a somewhat longer inclined bottom face 33 disposed at a lesser acute angle to the axis of the pipe such as about 15 degrees. The inclined faces 30 and 33 converge near and above the axial center of the adapter ring as at 34. The sides 35 of each lower groove 29 converge downwardly and the lower wedge element 27 cannot escape from the lower end of the groove 29 because of its sides 35 and a bottom abutment ledge 36, as shown in FIGURE 6.

An axialy extending groove or keyway 37 is formed centrally through the bottom walls of each pair of dovetailed grooves 28 and 29 to guide and align the wedge elements 26 and 27 during their movement.

Each wedge element 26 has an outer cylindrically curved face 38 substantially concentric with the periphery of the adapter 18 and an inner flat face 39 adapted to slide upon the inclined face 30. The wedge element 26 tapers toward its lower end, that is to say, the faces 38 and 39 converge downwardly toward the shallower end of the groove 28. The sides 40 of wedge element 26 are angled to interfit with the dovetailed side walls 31. Each wedge element 26 is provided upon its rear side with an axially extending key projection 41 for sliding close fitting engagement within the keyway 37. The element 26 has an axial cylindrical opening 42 formed therethrough from end-to-end, parallel to the axis of the pipe and formed partly through the projection 41 as shown.

Each lower wedge element 27 is similarly constructed as shown in the drawings with its tapered end facing upwardly toward the shallow end of the dovetailed groove 29 and its broader end arranged downwardly facing the ledge 36. Otherwise the detailed construction of the element 27 is very similar to the element 26 and need not be described in greater detail due to the disclosure in FIGURES 6 and 7 and the foregoing description of the wedge element 26. The two elements 26 and 27 have their tapered ends opposed adjacent the shallower ends of the grooves 28 and 29 in assembly. The element 27 has a key projection 43 like the previously-described projection 41 and an axial screw-threaded opening 44 is formed through each element 27 from end-to-end as shown.

The wedge elements 26 and 27 of each wedge unit 25 are engaged in the respective grooves 28 and 29 slidably and with the key projections 41 and 43 engaging the keyway 37. The lowermost wedge element 27 is introduced first into the longer groove 29 and the element 26 is then introduced into the groove 28 and the parts are disassembled in the reverse order. An Allen head machine screw 45 extends through the clearance opening 42 of wedge element 26 and has screw-threaded engagement with the threaded opening 44 of the adjacent wedge element 27. An expansible coil spring 46 surrounds each screw 45 and has its ends bearing upon the inner opposed ends of the elements 26 and 27 to normally maintain them separated and urged toward the opposite ends of the adapter 18.

As previously mentioned, each locking wedge unit 25 is identical in construction and the above detailed description of a single wedge unit may serve to describe all of the units 25 which are bodily mounted upon the split adapter assembly or ring 18.

In use, with the pipe ends assembled telescopically as in FIGURE 3 and with the seal 24 first applied over the enlargement 12 and the split adapter assembly also applied over the spigot end 10 prior to the introduction of the same into the bore of the hub 15, means are brought into play for compressing the seal 24 and then tightening the locking wedge units 25.

Such means includes a tool indicated broadly at 47 in FIGURE 1, and comprising companion lever arms 48 and 49 hingedly connected as at 50. U-shaped yoke extensions 51 and 52 are carried by the lever arms 48 and 49 at their forward ends for straddling engagement over the pipe end 10 and hub 15 respectively, the yoke 52 being broader than the yoke 51. Clamping dogs 53 are pivoted at 54 to the opposite sides of the yoke 51 on the inner face thereof for direct pushing engagement against the outer end of the adapter assembly 18 in the annular chamber 21. An upstanding hook extension 55 on the center of the yoke 52 rests upon the end of flange 16 as shown in FIGURE 1 to steady the tool 47 with respect to the pipe sections. An adjusting screw 56 extends through a clearance opening in the lever arm 48 and has screw-threaded engagement at 57 with the other lever arm 49 so that the two arms may be drawn together and locked. A coil spring 58 surrounds the screw 56 between the arms of the tool to urge them normally apart.

With the tool 47 applied to the work as shown in FIGURE 1, the screw 56 may be tightened with a wrench or if necessary a mallet may be employed as indicated to force the adapter assembly 18 axially into the annular chamber 21 for tightly compressing the annular seal 24 in the manner indicated in FIGURE 3. In this connection, the bottom of the bore of adapter assembly 18 is preferably beveled as at 59 in parallel relation to the surface 13. The screw 56 is securely tightened to maintain the seal 24 under compression for effectively sealing the pipe joint. While so held under compression by the tool 47, an Allen wrench 60 or the like is utilized to tighten each of the screws 45 of the several locking wedge units 25 to complete the assembly of the joint. Final tightening of the screws 45 may take place as in FIGURE 2 after removal of the tool 47 from the pipe.

A very important part of the invention is embodied in the locking wedge units 25, each of which units is independently adjustable and each wedge element 26 and 27 is also independently adjustable and self-adjusting in the following respect. When each screw 45 is tightened while the seal 24 is held under compression, the wedges 26 and 27 of the respective units 25 both tend to be drawn toward the shallow ends of the dovetailed grooves 28 and 29 or toward the axial center of the adapter assembly 18. However, due to the fact that the surface 30 has a greater slope relative to the pipe axis than the surface 33, the wedge element 26 will shift radially of the adapter assembly more quickly than the companion wedge element 27. Additionally, and depending upon the particular contours of the cast surface of the bore of hub 15, one wedge element or the other of each pair 26 and 27 may first come into positive engagement with the hub 15 upon drawing up of the screw 45. As this takes place, the outward radial movement of the one wedge element in each pair will cease but the other element 26 or 27 will continue to shift outwardly radially until firmly seated and locked against the bore of the hub 15. Thus, on the entire assembly 18, the eight separate wedge elements 26 and 27 upon tightening of the screws 45 are independently adjusted into locking engagement with the hub 15 regardless of the surface irregularities of the bore of the hub as frequently encountered with cast iron soil pipe. By virtue of this arrangement, the adapter assembly 18 is securely locked into place and holds the seal or gasket 24 under compression to form a perfect seal and a rigid pipe joint or connection as will now be obvious to those skilled in the art in view of the foregoing description.

It is also a simple matter, when required, to loosen the screws 45 and separate the pipe joint, although this is seldom done in practice once the parts are assembled. The joint and seal achieved by the invention are far superior to the prior art including the conventional lead and oakum joint and other like well known devices. Any desired number of the wedge locking units 25 may be employed on the assembly 18. Additionally, if preferred, the assembly 18 may be split circumferentially as well as diametrically if desired. The semi-circular sections 19 and 20 may be formed of metal with machining operations or they may be molded from plastics material, die cast, or formed in any other preferred manner.

It is to be understood that the form of the invention herewith shown and described is to be taken as a preferred example of the same, and that various changes in the shape, size and arrangement of parts may be resorted to, without departing from the spirit of the invention or scope of the subjoined claims.

Having thus described our invention, we claim:

1. A joint for pipes and the like comprising telescopically interfitting pipe parts defining between them an axially deep annular space of substantially uniform radial width, a compressible seal ring disposed within said annular space near the bottom thereof remote from the mouth of said annular space and occupying a relatively small volume of said annular space, a rigid ring unit which is axially disposed bodily within the annular space and occupying substantially the remaining volume of said annular space axially outwardly of the seal ring and adapted to engage the seal ring near the bottom of said space only to compress the seal ring axially and radially within the bottom of said space, said rigid ring unit engaging the bore of one pipe part and the periphery of the other pipe part over the major portion of the telescoping areas thereof to stabilize the latter, said rigid ring unit provided in its radially outer periphery with a plurality of circumferentially spaced wedge faces which taper axially in opposite directions relative to the ends of the rigid ring unit, pairs of oppositely tapering wedge elements slidably engaging said oppositely tapering wedge faces and adapted to project radially beyond the rigid ring unit in certain adjusted position of the wedge elements, whereby the latter may grip the bore of said one pipe part at a plurality of different localities to firmly anchor the rigid ring unit thereto, and axially extending screw-threaded means interconnecting the wedge elements of each pair to operate the same axially of the rigid ring unit and disposed bodily with the rigid ring unit in said annular space so that all parts are confined within the annular space.

2. The invention as defined by claim 1, and wherein said oppositely tapering wedge faces form the bottom faces of dovetailed recesses in said rigid ring unit, each recess provided in its bottom face with an axially extending keyway substantially coextensive lengthwise with said wedge faces, said tapering wedge elements including faces slidably engaging the bottom faces of said recesses and having key projections slidably engaging within said keyways, said wedge elements having peripheral faces projecting radially beyond the periphery of said rigid ring unit, one wedge element of each pair having a clearance opening extending axially therethrough and the other wedge element of each pair having a screw-threaded opening extending axially therethrough, an adjusting screw engaging through said openings of each pair of wedge elements and operable adjacent one end of the rigid ring unit to independently adjust each wedge element, and a spring surrounding each adjusting screw between each pair of wedge elements and engaging the latter and urging them in opposite axial directions.

3. The invention as defined by claim 2, and wherein each pair of said oppositely tapering wedge faces includes one face having a shorter length and a greater degree of inclination to the axis of the rigid ring unit than the other face of such pair, whereby said screw-threaded adjustment causes a differential movement of the wedge elements of each pair so that the latter can seat themselves independently against the bore of said one pipe part regardless of surface irregularities in such bore.

References Cited in the file of this patent
UNITED STATES PATENTS

| | | |
|---|---|---|
| 503,033 | Boorman | Aug. 8, 1893 |
| 525,775 | Wainwright | Sept. 11, 1894 |
| 763,542 | Crawford et al. | June 28, 1904 |
| 2,832,615 | Summers | Apr. 29, 1958 |